US008117183B2

(12) United States Patent
Mestha et al.

(10) Patent No.: US 8,117,183 B2
(45) Date of Patent: Feb. 14, 2012

(54) ACCURATE CONTENT-BASED INDEXING AND RETRIEVAL SYSTEM

(75) Inventors: Lalit Keshav Mestha, Fairport, NY (US); Sohail A. Dianat, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 593 days.

(21) Appl. No.: 12/273,208

(22) Filed: Nov. 18, 2008

(65) Prior Publication Data
US 2009/0300055 A1 Dec. 3, 2009

Related U.S. Application Data

(60) Provisional application No. 61/056,737, filed on May 28, 2008.

(51) Int. Cl.
G06F 7/00 (2006.01)
G06F 17/30 (2006.01)
(52) U.S. Cl. ........................................................ 707/711
(58) Field of Classification Search .................. 707/711, 707/602
See application file for complete search history.

(56) References Cited

U.S. PATENT DOCUMENTS

| 6,584,221 | B1 | 6/2003 | Moghaddam et al. |
| 6,907,412 | B2 | 6/2005 | Pao et al. |
| 7,079,686 | B2 | 7/2006 | Ahmed et al. |
| 2002/0152069 | A1* | 10/2002 | Gao et al. ........................ 704/240 |
| 2003/0179213 | A1* | 9/2003 | Liu ................................. 345/619 |
| 2006/0107216 | A1* | 5/2006 | Cooper et al. .................. 715/724 |

* cited by examiner

Primary Examiner — Hosain T Alam
Assistant Examiner — Van Oberly
(74) Attorney, Agent, or Firm — Fay Sharpe LLP

(57) ABSTRACT

The computer algorithm described which indexes and retrieves images. A query in the form of an image object or an image facilitates image retrieval in order to retrieve several images close to user's request. A thumbnail form of rank ordered images is provided for viewing. The user selects the images and down loads the images for inclusion in the job. The images are then ripped and printed.

20 Claims, 8 Drawing Sheets

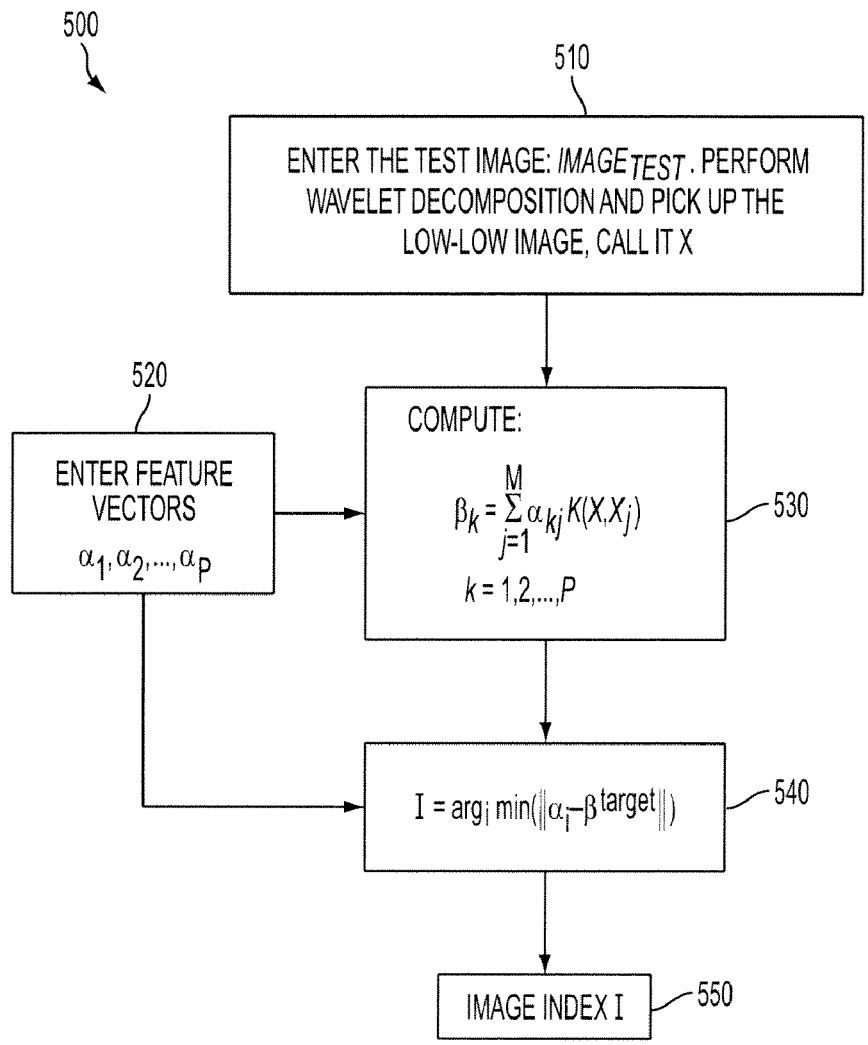

ACCURATE CONTENT-BASED INDEXING AND RETRIEVAL SYSTEM

This application claims the benefit of U.S. Provisional Application No. 61/056,737, filed May 28, 2008, the disclosure of which is incorporated herein in its entirety by reference.

BACKGROUND

The indexing and retrieval of images is either context-based dependent on literal key words, or is content-based dependent on quantifiable visual features of the image.

Context-base searches use textual information about images to search. This requires human users to type in terms that personally describe every image in the database. One problem with the personal description of every image is this becomes impractical for very large databases and also impractical for images that are generate a large number of images automatically, such as images from surveillance cameras. Another problem with context-based systems is that different descriptions may use different synonyms to describe similar images, causing separate searches based on different descriptions to miss similar images.

A context-based search may also include query by example which uses a sample image as the basis of a search. One problem with such an underlying search algorithm is that the algorithm may depend on the application, such that images retrieved by a search all share common elements with the provided example. Examples of such images include preexisting images supplied by the user or chosen at random, or a drawn rough approximation of an image to be searched. Such a query technique may remove the difficulties that can arise when trying to describe images with words.

Content-based image retrieval, also referred to by the terms query by image content, or as content-based visual information retrieval, is a substitute for traditional text based search queries which use metadata captions or keywords of searching for digital images in large databases. Content-based searches analyze the actual contents of the image. The term 'content' refers to colors, shapes, textures, or information that may be derived from the image itself.

Content-based has been used to describe the process of retrieving desired images from a large collection on the basis of syntactical image features. The techniques, tools and algorithms that are used originate from fields such as statistics, pattern recognition, signal processing, and computer vision. Content-based image retrieval is an alternative to text-based metadata systems.

Most content-based methods are not suited for general class of images because they are based on verbal descriptions of the images or they access images based on color and texture. In the art, U.S. Pat. No. 7,079,686 to Ahmed classifies pixels in a document image as either an image or text and also incorporates image enhancement and background suppression, but does not incorporate general class imaging. Furthermore, U.S. Pat. No. 6,584,221 to Moghaddam uses an estimated joint distribution to classified images by regions of interest and extracts color and textual features, but does not incorporate general classes of images. Recent statistical advances in Nonlinear Principal Component Analysis (NLPCA) indicate that they may give a framework for improving the accuracy of image retrieval and may be suited for improving the content-based image retrieval.

The present application provides an improved system and method which overcomes the above-referenced methods for using the content of images to index and retrieve images in a computer operable database.

In accordance with one aspect, a method is presented for indexing, organizing, and retrieving the images stored in a database.

In accordance with one aspect, a system is presented for indexing, organizing, and retrieving the images stored in a database.

An advantage resides in providing a search means for locating an image based on non-keyword based parameters such as, but not limited to, color, shape, and texture. Such a search does not require a searcher to verbally describe the image being searched for during a search.

A further advantage resides in providing an optimum transform of the data involved in performing a search.

A still further advantage resides in providing relevance feedback to a search, which enables a searcher to narrow a search faster than when relevance is not provided during the search process.

A still further advantage is the search overcomes the limitations inherent in context-based search systems by applying NLPCA to facilitate the indexing and retrieval of image content.

The present application may take form in various components and arrangements of components, and in various steps and arrangement of steps. The drawings are only for purposes of illustrating the preferred embodiments and are not to be constructed as limiting the invention.

BRIEF DESCRIPTION

The computer algorithm described in this present application will index and retrieve images. When the query is supplied in the form of an image object or an image, the image retrieval algorithm will bring out several images and compare close to user's request. A thumb nail form of rank ordered images can be provided for viewing. The user can then select and down load an image for inclusion in their job, and then RIP and print the image.

BRIEF DESCRIPTION OF THE DRAWINGS

FIG. 5 image indexing is performed;

FIG. 6 illustrates the nonlinear PCA algorithm;

DETAILED DESCRIPTION

Figure 1:
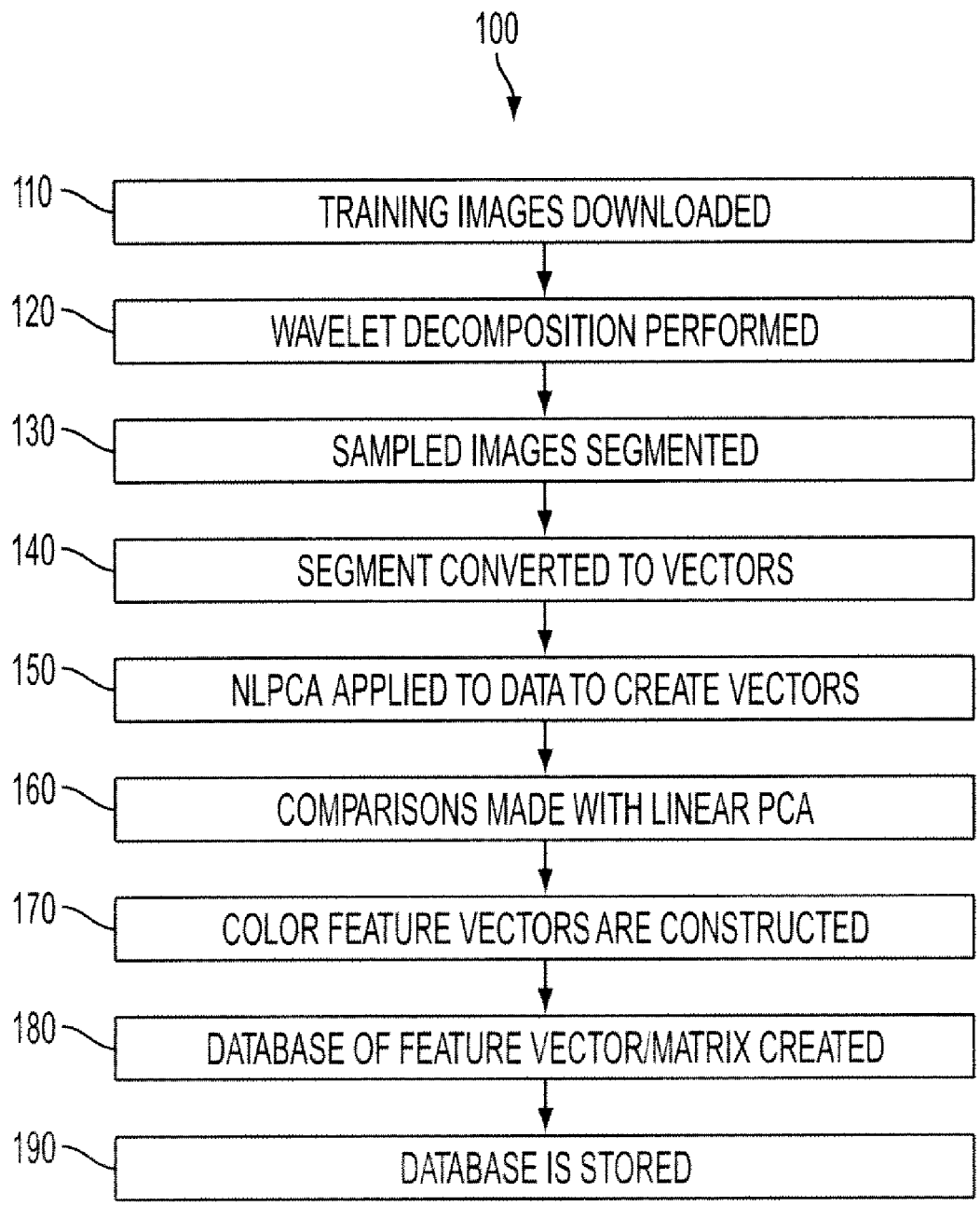
FIG. 1 illustrates the image indexing method.

With reference to FIG. 1, an image indexing method of the present application comprises a series of steps 100 is presented. A content-based image retrieval system which uses metadata captions or keywords may involve semantic retrieval, in which the user makes a request like "find pictures of dogs" or "find pictures of Abraham Lincoln." Such systems make use of lower-level features like texture, color, and shape, although some systems take advantage of very common higher-level features like facial recognition system. Other query methods include browsing for example images, navigating customized/hierarchical categories, querying by image region rather than the entire image, querying by multiple example images, querying by visual sketch, querying by direct specification of image features, and multimodal queries such as combining touch with voice.

In a first step, the training images are down loaded 110. The present application employs down sampling, which is a process of using only a portion of all of the samples taken of a signal. This is the equivalent of reducing the sampling rate and/or increasing the sampling interval. Prior to down sampling, the signal is usually preceded by passing the signal through a low-pass filter.

Next, wavelet decomposition 120 is performed to reduce the image size with some or little aliasing. Wavelet decomposition, which is a projection of a signal on a set of wavelet based vectors, where each wavelet vector can be computed as the dot product of the signal with the corresponding basis vector. Wavelet decomposition is based on expansion of an unknown value in wavelet series using a basis function. A wavelet contains both a frequency and a scale. The scale can be used as a basis for a scaling factor which is divided into the basis function to expand the x-axis of the wave if the scaling factor is greater than one, and compress the wave if the scaling factor is less than one. The amplitude of the wave on the y-axis can similarly be compressed or expanded. Wavelet decomposition may use down sampling.

A section of the image or the whole image is input to the retrieval algorithm such as, but not limited to, faces, buildings, trees. The algorithm then down samples the section of the image or the whole image and vector length adjustment is made to match the length of the feature vector. This segments the image if the whole test image is used as input and then extracts the feature vectors or matrices. The Euclidean distance between feature vectors or matrices from the test image are compared to the database and then rank ordered. Images are then retrieved based on the ranking.

Then the images that were down sampled are now segmented 130. Content-based image retrieval systems can also make use of relevance feedback, where the user progressively refines the search results by marking images in the results as "relevant", "not relevant", or "neutral" to the search query, then repeating the search with the new information. Many content comparison methods can be used for extracting content from images so that they can be easily compared.

Then each segment is converted to vectors 140 by applying the Nonlinear Principal Component Analysis (NPCA) methods 150 to the data ensemble to construct feature vectors or matrices. The NLPCA approach performs the task of exploring the relationships among descriptors as an optimization problem using an alternating least squares algorithm. This approach uses descriptors of measurement types such as: numerical, implying linear relationships, ordinal, implying monotonic increasing relationships, and unordered multinominal, implying one-to-one relationships between the categories of the variables. The measurement levels of the descriptors are transformed into quantifications. The algorithm searches for the optimal mean squared correlation between newly quantified variables and the components by varying both the component loadings and their quantifications. When all variables are treated as single numerical measurements, the solution is equivalent to linear principal component analysis. Multi-nominal descriptors may be assigned separate quantifications for each component, especially when one type of contrast between the categories is related to the descriptors in the first component, and a different type of contrast is related to the descriptors in another component. NLPCA is a neural-net-based generalization which may use an auto-associative multi-layer perception network architecture. Another approach uses the principal curves method, which finds a non-linear curve which passes through the middle of the data points. While the neural network NLPCA method has the advantage of using analytical mapping functions, its projection function may be sub-optimal.

The present application applies NLPCA techniques to content-based image indexing and retrieval. In content-based image retrieval problem, digital images are searched in large databases by analyzing actual contents of the image such as color, shape, texture. If the contents are not examined, then searches have to be done based on metadata such as keywords, which may take a long amount of time before the search results are produced by a computer. Also, any content-based search should be accurate and fast. There are many uses to this type of search capability. For example, in a web/grid based color management service application, customer downloads numerous images to a corporate storage space. Images could be in quantities of millions.

Then comparisons are made with the linear Principal Component Analysis (PCA) approach 160. PCA is a vector space transform often used to reduce multidimensional data sets to lower dimensions for analysis. PCA is mathematically defined as an orthogonal linear transformation that transforms the data to a new coordinate system such that the greatest variance by any projection of the data comes to lie on the first coordinate, the second greatest variance on the second coordinate, and so on. PCA is theoretically the optimum transform for a given data in least square terms. PCA is mostly used as a tool in exploratory data analysis and for making predictive models. PCA involves the calculation of the eigenvalue decomposition of a data covariance matrix or singular value decomposition of a data matrix, usually after mean centering the data for each attribute. The results of a PCA are usually discussed in terms of component scores and loadings. PCA is the simplest of the true eigenvector-based multivariate analyses. Often, its operation can be thought of as revealing the internal structure of the data in a way which best explains the variance in the data. If a multivariate dataset is visualized as a set of coordinates in a high-dimensional data space PCA supplies the user with a lower-dimensional picture, a "shadow" of this object when viewed from its most informative viewpoint. PCA is closely related to factor analysis; indeed, some statistical packages deliberately conflate the two techniques. True factor analysis makes different assumptions about the underlying structure and solves eigenvectors of a slightly different matrix. PCA can be used for dimensionality reduction in a data set by retaining those characteristics of the data set that contribute most to its variance, by keeping lower-order principal components and ignoring higher-order ones.

For color images RGB feature vectors may be constructed for each of the image color separation of RGB or of color spaces 170. Retrieving images based on color similarity is achieved by computing a color histogram for each image that identifies the proportion of pixels within an image holding specific values that humans express as colors. Current research is attempting to segment color proportion by region and by spatial relationship among several color regions. Examining images based on the colors they contain is one of the most widely used techniques because it does not depend on image size or orientation. Color searches will usually involve comparing color histograms, though this is not the only technique in practice.

In addition to or as a substitute for color vectors, texture may also be used as a search index. Texture measures look for visual patterns in images and how they are spatially defined and are represented by text patterns which are placed into a number of sets, depending on how many textures are detected in the image. These sets not only define the texture, but also where in the image the texture is located. The identification of specific textures in an image is achieved primarily by modeling texture as a two-dimensional gray level variation. The relative brightness of pairs of pixels is computed such that degree of contrast, regularity, coarseness and directionality may be estimated.

In addition to or as a substitute for color vectors or texture, shape may also be used as a search index. Shape does not refer to the shape of an image but to the shape of a particular region that is being sought out within an image. Shapes will often be determined first applying segmentation or edge detection to an image. In some cases accurate shape detection will require human intervention because methods like segmentation are very difficult to completely automate.

In another embodiment of the present application, accurate image indexing algorithms shown in this present application may be used for Image Indexed Rendering. Processing each segment of the image through different rendering profiles may make the images look consistent. In this application, jobs to be printed are segmented into many different segments, databases of rendering profiles are constructed and indexed a priori. A rendering profile is identified for each segment and applied to the respective segments and then printed.

Figure 2:
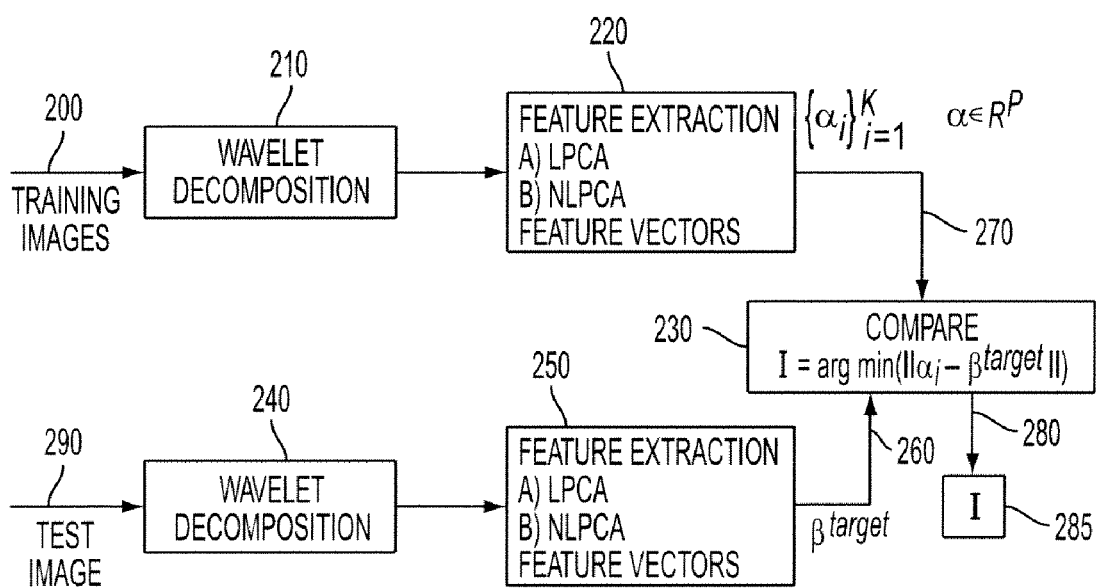
FIG. 2 illustrates schematically the block diagram of the image indexing system for black and white images.

The three feature vectors, as in R, G, B, form a feature matrix. A database of feature vector/matrix with correspondence to each of the image segment is then formed 180 and then the image is stored 190. During image retrieval stage, a user can enter a text based query as in Natural Language System or an image based query. In this present application, an image based query is described. This database can be on a computer operable medium and may store the data in a computer memory. The database may also be structured by placing the data into a series of database tables, each containing primary and secondary keys. The data tables may be linked using the structured query language (SQL) which may also retrieve data when written into the form of queries. The database may be used in a system such as, but not limited to, Oracle, Sybase, IBM, Microsoft SQL Server, MySQL, and the like With reference to FIG. 2, a schematically block diagram of the image indexing system for black and white images 200 is presented. The training images are first down sampled. Then wavelet decomposition 210 is used to reduce the image size without much aliasing. The down sampled images are then segmented. Each segment is converted to vectors 220. Nonlinear PCA methods are applied to the data ensemble to construct the feature vectors 230. The test image is down sampled using wavelet decomposition 240 to reduce the image size without much aliasing. The down sampled images are then segmented. Each segment is converted to vectors 250. Nonlinear PCA methods are applied to the data ensemble to construct the feature vectors 260. Then the results of the training image and the test image are compared 270 to produce an index 280.

Figure 3:
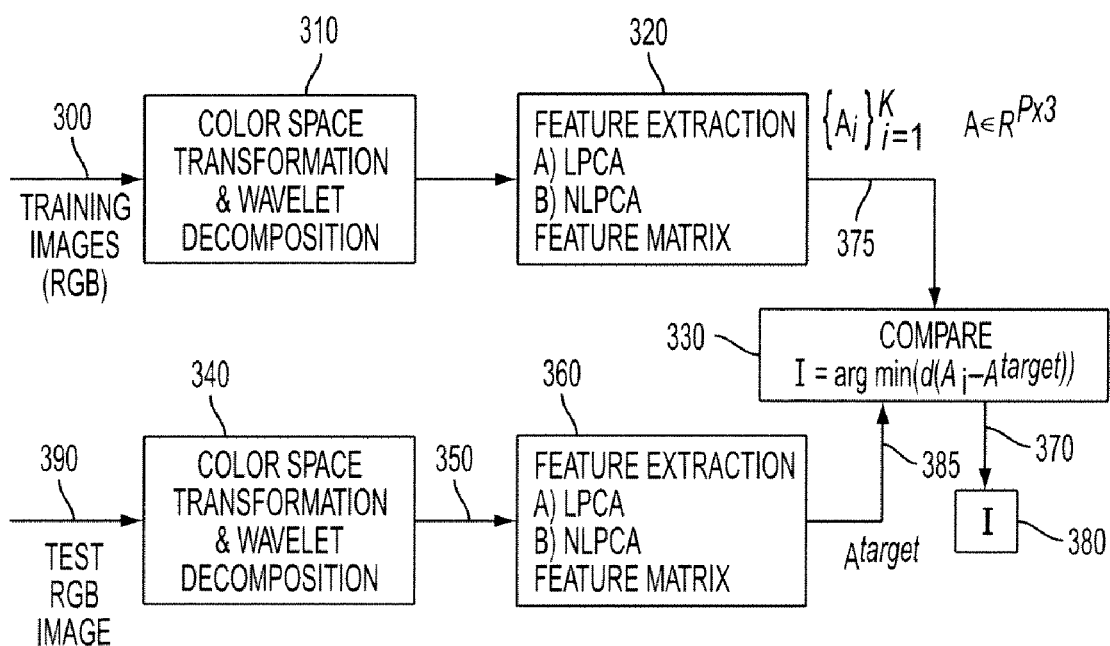
FIG. 3 illustrates schematically the block diagram of the image indexing system for color images.

With reference to FIG. 3, a block diagram of the image indexing system for color images 300 is shown schematically. This procedure is applied offline to a variety of test images. The training images are first down sampled using wavelet decomposition 310 to reduce the image size without using too much aliasing. Then the down sampled images are segmented 320. Each segment is then converted to vectors 330. Nonlinear PCA methods are applied to the data ensemble to construct the feature vectors 330. For color images, feature vectors are constructed for each of the image color separation in a RGB or for color spaces. The test image is down sampled using wavelet decomposition 340 to reduce the image size without much aliasing. The down sampled images are then segmented. Each segment is converted to vectors 350. Nonlinear PCA methods are applied to the data ensemble to construct the feature vectors 360. Then the results of the training image and the test image are compared 370 to produce an index 380. The three feature vectors for R, G and B form a feature matrix. A database of feature vector/matrix with correspondence to each of the image segment in the training image is then formed and stored.

Figure 4:
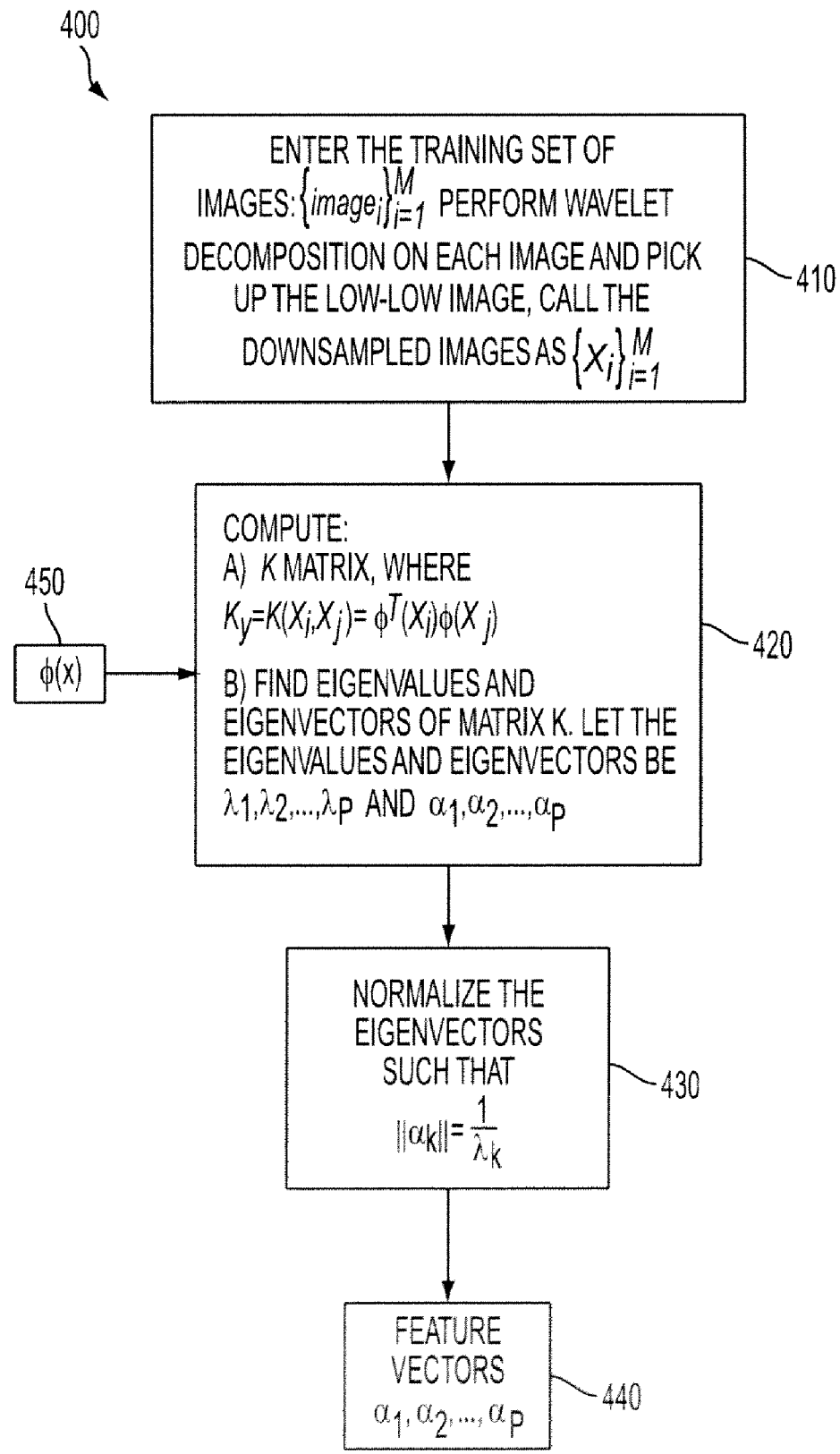
FIG. 4 illustrates the process for generating feature vectors.

With reference to FIG. 4, the process for generating feature vectors is presented 400. First a training set of images is entered and these images are subjected to wavelet decomposition 410. Then a matrix is computed and the eigenvalues are found 420 using 450. Next the eigenvectors are normalized 430 and the feature vectors are generated 440.

With reference to FIG. 5, image indexing is presented 500. First a test image is entered and wavelet decomposition is performed to pick up a low-low image 510. Then this low-low-image along with the feature vectors 520 are used to compute $\beta_k$ 530. From this, an image calculation is performed 540 to create an image index 550.

With reference to FIG. 6, the nonlinear PCA algorithm 600 is presented. Details of the nonlinear PCA algorithms are described herein. NLPCA is used to compare the results. NLPCA is a mathematical and statistical technique used to reduce multidimensional data sets to lower dimensions for analysis and is used primarily to create predictive models. NLPCA is an orthogonal linear transformation which transforms data onto a new coordinate system so that the first coordinate, also called the principal component, represents the projection with the greatest variance. NLPCA retains characteristics that contribute most to data variance and ignoring components that do not contribute to variance, thus retaining the most important aspects of the data. Such a technique ignores the structure of the data distribution and can produce a faithful one-dimensional representation of two-dimensional nonlinear data.

Within the formula presented 600, the variable C 610 represents the Correlation matrix; the variable M 620, 625 represents the number of basis vectors or sample size of the data matrix; the variable I 630, 655, 685 represents the number of vectors; the variable φ 640, 660 represents a function of the data vector X; the variable X 650, 680 represents a coordinate of the data vector, and the variable T 670 represents a transpose.

Derivation of the formula is demonstrated in equations 1-12, and several common nonlinear principals are defined in equations 13-18. An example of a quadratic nonlinear correlation is presented in example 1.

Linear PCA works well only if the correlation between data sample vectors is linear. Nonlinear correlation and deviation from Gaussian assumption cannot be handled by LPCA. Nonlinear principal component (NLPCA) analysis is another approach to derive the features that correlate with the data much better than LPCA. A class of NLPCA is called kernel PCA. In this invention, the Kernel PCA is discussed. In Kernel PCA the data is transformed through nonlinearity to another space that removes the nonlinear correlation and then a linear PCA is applied. Let $\phi(X)$ be a mapping from $R^N$ to $R^N$. We define the $N_1 \times N_1$ correlation matrix $$C = \frac{1}{M}\sum_{i=1}^{M} \phi(X_i)\phi^T(X_i) \quad (1)$$

Similar to linear PCA, we assume that the vectors $\{\phi(X_i)\}_{i=1}^M$ have zero mean; if not, the mean is subtracted from each vector. We then compute the eigenvalues and eigenvectors of the correlation matrix C $$CV_k = \lambda_k V_k \; k=1, 2, \ldots, N_1 \quad (2)$$

Or in matrix form, $$CV = DV \quad (3)$$

In Equation (3), V is a matrix of eigenvectors (modal matrix) and D is the diagonal matrix of eigenvalues. Then, there exists a set of numbers $\{\alpha_j\}_{j=1}^M$ such that $$V_k = \sum_{j=1}^{M} \alpha_j \phi(X_j) \quad (4)$$

Substituting equations 1 and 4 into 2 yields $$\frac{1}{M}\sum_{j=1}^{M}\sum_{i=1}^{M}\alpha_i \phi(X_i)\phi^T(X_i)\phi(X_j) = \lambda_k \sum_{j=1}^{M}\alpha_j \phi(X_j) \quad (5)$$

Multiplying both sides of equation (5) by $\phi^T(X_k)$, we obtain $$\frac{1}{M}\sum_{j=1}^{M}\sum_{i=1}^{M}\alpha_i \phi^T(X_k)\phi(X_i)\phi^T(X_i)\phi(X_j) = \lambda_k \sum_{j=1}^{M}\alpha_j \phi(X_j)\phi^T(X_k) \quad (6)$$

Defining $K(X_i, X_j) = \phi^T(X_i)\phi(X_j)$, equation (6) can be simplified as $$\sum_{j=1}^{M}\sum_{i=1}^{M}\alpha_i K(X_k, X_i)K(X_i, X_j) = M\lambda_k \sum_{j=1}^{M}\alpha_j K(X_k, X_j) \quad (7)$$

Let the M×M matrix K be defined as $K_{ij} = K(X_i, X_j) = \phi^T(X_i)\phi(X_j)$, and $\alpha = [\alpha_1 \; \alpha_2 \; \ldots \; \alpha_m]^T$, then (7) can be written as $$K^2 \alpha = M\lambda_k K\alpha \quad (8)$$

Multiplying both sides of equation (8) by the nonsingular matrix $K^{-1}$ results in $$K\alpha = M\lambda_k \alpha \quad (9)$$

Equation (9) is an eigenvalue, eigenvector decomposition that can be solved for the feature vectors $\alpha$. Therefore, to construct $\alpha$, we use the following algorithm:

1. Given the data vectors $X_1, X_2, \ldots, X_M$, find the M×M matrix K, where $$K_{ij} = \phi^T(X_i)\phi(X_j) \quad (10)$$

2. Compute eigenvalues and eigenvectors of K.

$$K\alpha = \lambda \alpha \quad (11)$$

3. Normalize the eigenvectors such that $$\|\alpha_k\|^2 = \frac{1}{\lambda_k} \; \text{ for } k = 1, 2, \ldots P$$

4. Extract the first P principal components of a test vector by using the following equation $$\beta_k = \sum_{j=1}^{M} \alpha_{kj} K(X, X_j) \quad (12)$$

$$k = 1, 2, \ldots P$$

where $\alpha_{kj}$ is the $j^{th}$ component of vector $\alpha_k$.

Common nonlinearities used to extract the nonlinear principal components are

Linear Function:

$$K(x,y) = x^T y \quad (13)$$

Polynomial Function:

$$K(x,y) = (x^T y + 1)^m \quad (14)$$

Gaussian Function:

$$K(x, y) = \exp\left(-\frac{\|x-y\|^2}{2\sigma^2}\right) \quad (15)$$

Hybrid: Combination of Linear and Polynomial Functions $$K(x,y) = ax^T y + (1-a)(x^T y + 1)^m \; 0 \leq a \leq 1 \quad (16)$$

Sigmoid:

$$K(x,y) = \tan h(ax^T y + b) \quad (17)$$

We now show one example of applications of NLPCA: EXAMPLE 1: Data with quadratic nonlinear correlation: Consider two random variables $x_1$ and $x_2$ where $x_1$ is uniformly distributed between −1 and 1, and $x_2$ is obtained by adding zero mean Gaussian noise with variance $\sigma^2 = 0.1$ to $x_1^2$, that is $$x_2 = x_1^2 + N(0, \sigma^2) \quad (18)$$

The data matrix S consists of M=50 samples of vector $X = [x, x_2]^T$. The scatter plot of the data and the reconstructed data using the nonlinear principal components vectors. As it can be seen, there is a perfect match between the original data and the reconstructed data using nonlinear PCA. The linear PCA vectors can be seen a first principal component cannot capture the quadratic structure of the data. This is due to the fact that the correlation between the samples is nonlinear. Hence nonlinear PCA is more powerful for images, because most data in images has nonlinear correlation.

The imaging method of the present application uses wavelet decomposition to reduce image size. Wavelet decomposition is a projection of a signal onto a set of wavelet based vectors, where a wavelet is a shifted and scaled version of an original wave. The process transforms the distances from the origin or zero line of a wave to all points along a wave and then takes an average or adjacent distances to generate a simplified version of the wave, which also reduces the resolution or detail of the wave by half. These averages are then averaged again, repeatedly, producing progressively simpler waves. This process identifies significant and less significant variations in the image. As the coefficients are averaged, smaller differences or variations are smoothed from subsequent simplified waves that are generated, while the larger differences or variations are preserved. These larger variations are typically the lines or edges within a picture. When this simplification process is performed in the reverse of the order in which the simplified wave was created, the simplified wave can be used to reconstruct the original image which will retain the original fidelity and resolution.

During the image retrieval stage, a section of the image or a whole image is supplied as input. The section of the image may not exactly correspond to what is in the database. There should be some resemblance. For example, an image of a person's face will retrieve images that closely resemble the face. The algorithm then down samples the section of the test image. Image is vectored and the length is adjusted to match the length of the feature vector. After this, it performs wavelet decomposition. The system segments the image, performs NLPCA and then extracts the feature vectors or matrices. The distance between feature vectors or matrices obtained from the test image are compared to the database feature vectors or matrices and then the resulting search is rank ordered. Images are then retrieved based on the ranking.

Figure 7:
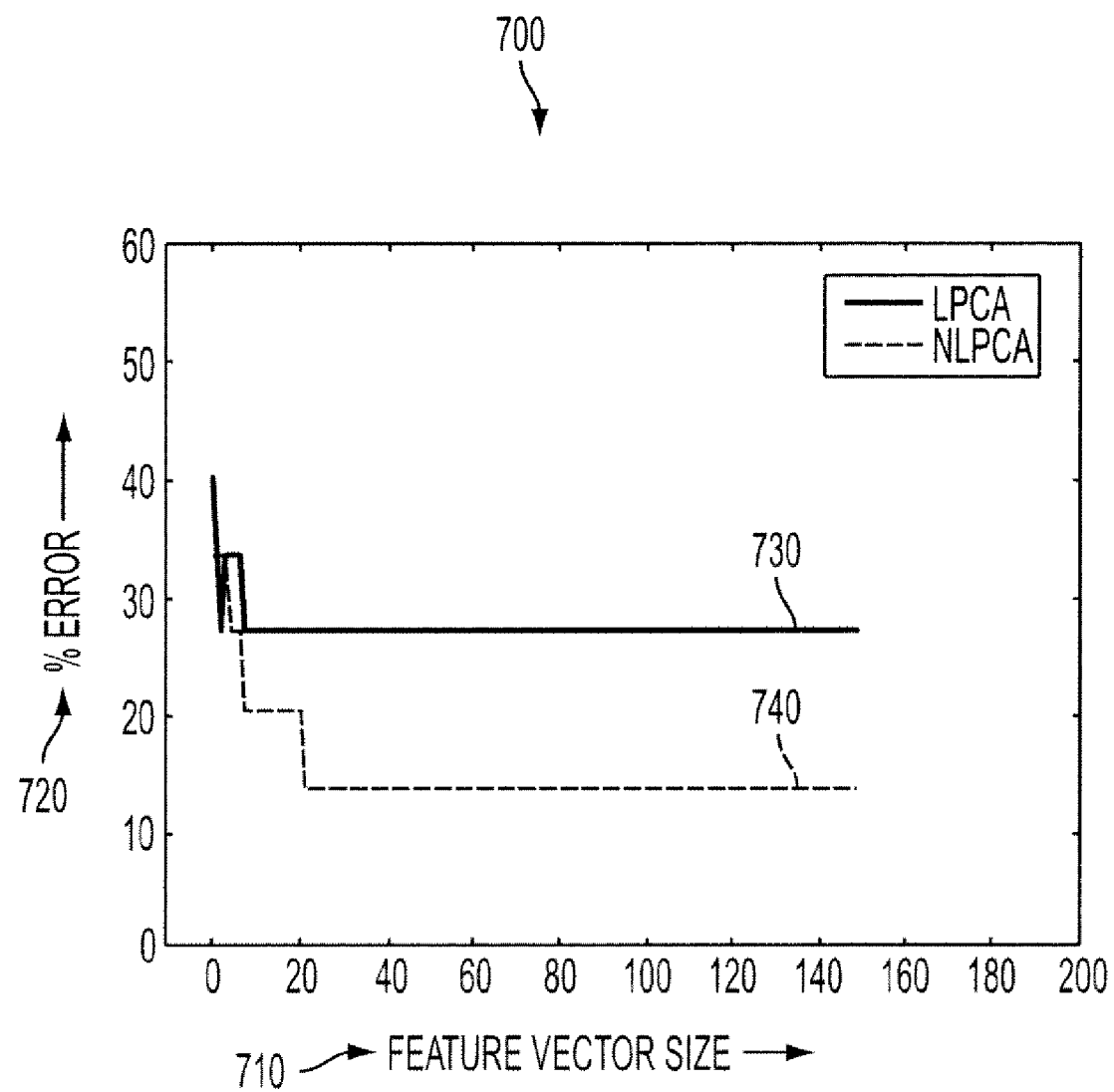
FIG. 7 illustrates the error as a function of feature vector size for both LPCA and NLPCA.

With reference to FIG. 7, this illustrates the error as a function of feature vector size 700. The x-axis 710 represents the feature vector size and the y-axis 720 represents the percent error. Both LPCA 730 and NLPCA 740 are represented. This demonstrates that as vector size increases, percentage error decreases until error reaches a constant level, and that NLPCA produces a lower overall error than does the LPCA.

Figure 8:
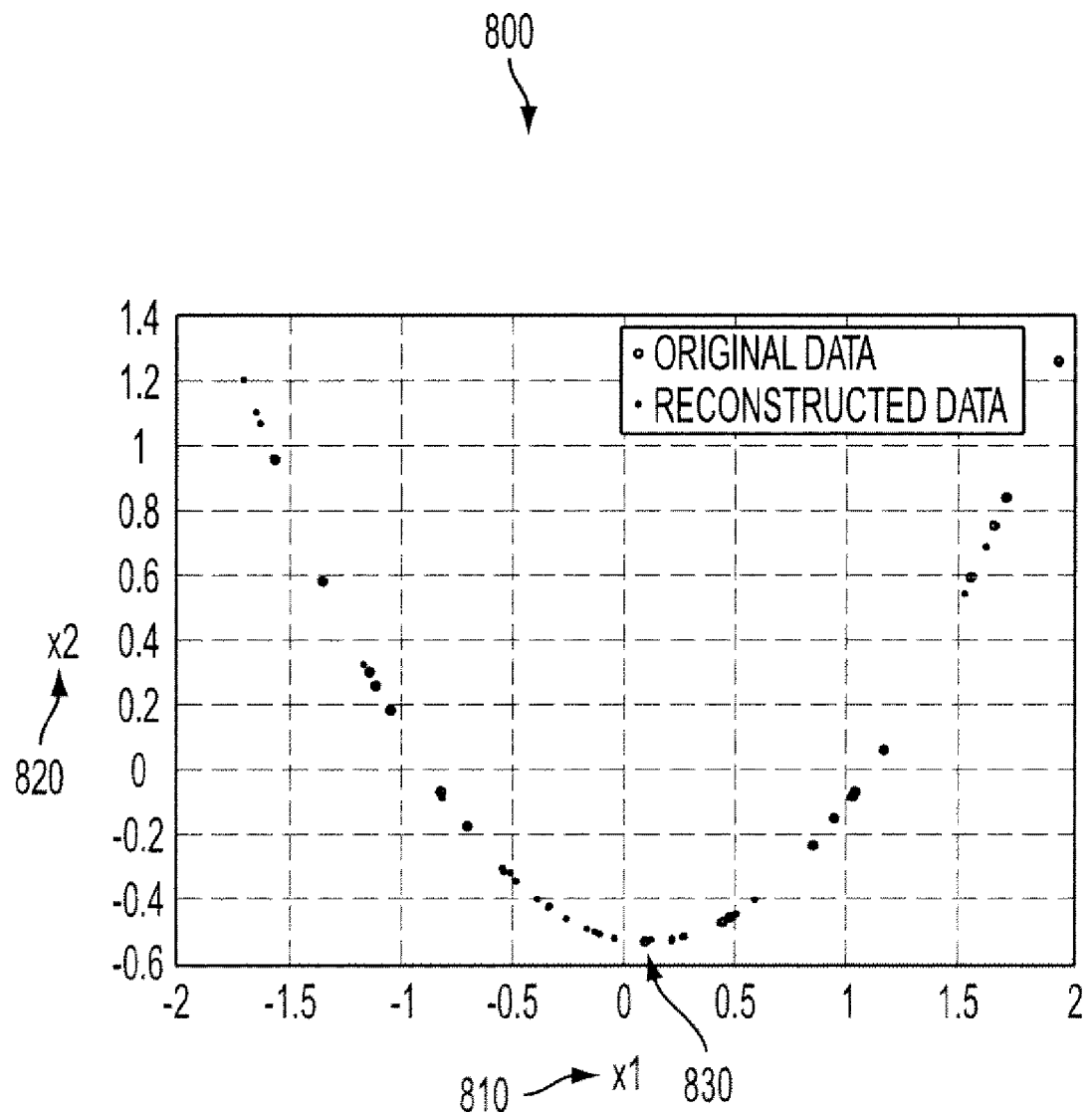
FIG. 8 shows the performance curve of the NLPCA algorithm.

With reference to FIG. 8, this shows the performance curve of the NLPCA algorithm 800. The axes of the graph are such that the axis 810 of X1 represents an example data vector uniformly distributed between minimum to maximum; and the other 820 axis X2 represents a second data vector which is a quadratic function of the first data vector (x1) with Gaussian noise with nonzero variance. The values of X1 and X2. Equation 30 shows how X2 changes as X1 is varied between −1 and 1. The minimum point 830 is at x=0.0 and y=−0.5.

Figure 9:
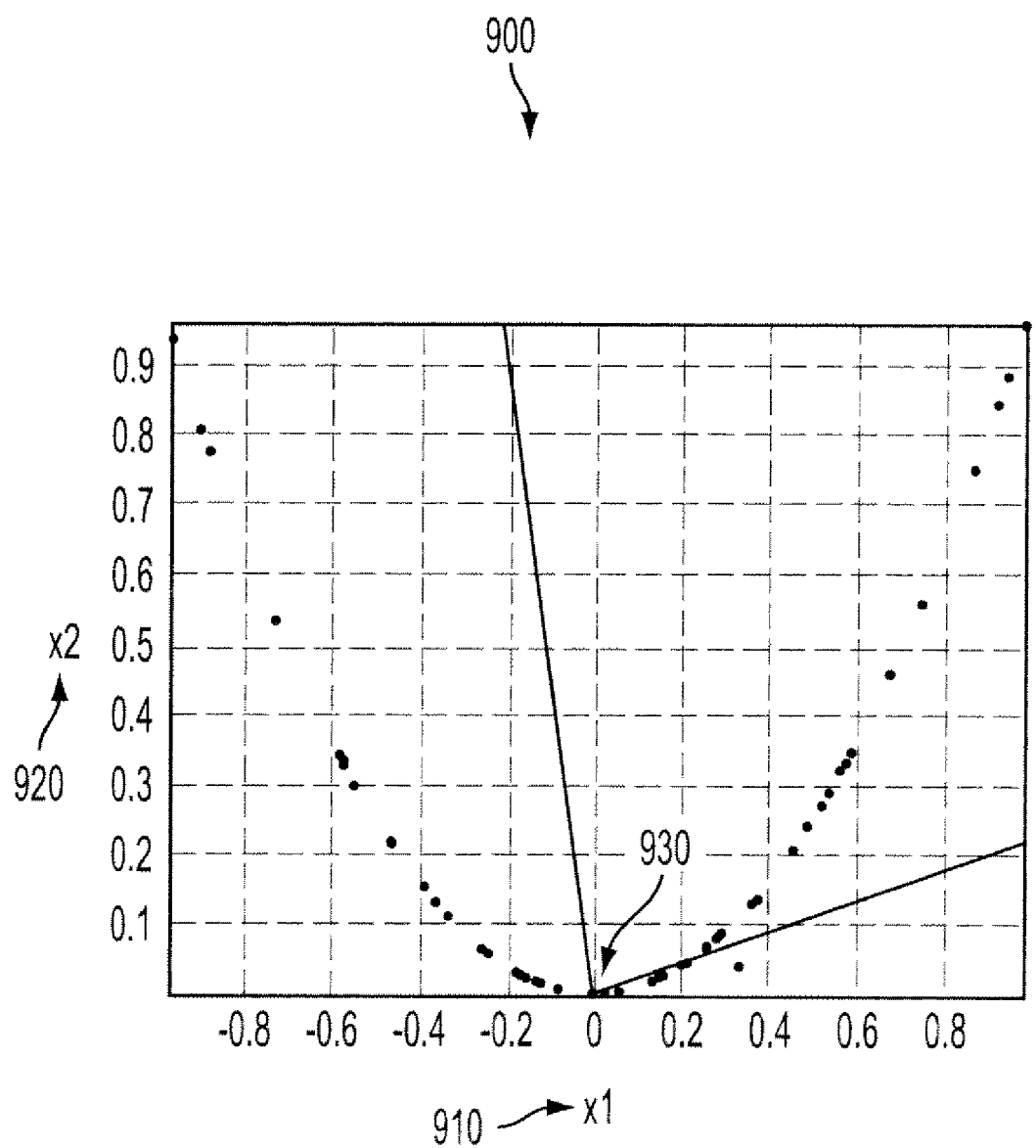
FIG. 9 shows the performance curve of the LPCA algorithm.

With reference to FIG. 9, this shows the performance curve of the LPCA algorithm 900. Comparing this linear PCA results with the previous NLPCA results, it may be seen that the retrieval error is smaller with NLPCA. As FIG. 8, so are the axes of the graph such that axis 910 of X1 represents an example data vector (uniformly distributed between minimum to maximum); and the other 920 axis X2 represents a second data vector which is a quadratic function of the first data vector (x1). However the minimum point 930 in this graph is where x=0 and y=0. This minimum point 930 is higher than the previous graph.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for indexing and retrieving content comprising:
   with a computer system, downloading a plurality of training images;
   performing down sampling on the plurality of training images and at least one test image;
   segmenting the down sampled images into one or more image segments;
   converting the one or more image segment into corresponding vectors;
   applying Nonlinear Principal Component Analysis (NLPCA) data to each vector so as to transform each vector into a corresponding feature vector via an orthogonal linear transformation;
   creating a feature vector matrix database associating each feature vector with the corresponding image segment;
   comparing a feature vector associated with the at least one test image and each of the feature vectors associated with the plurality of training images;
   generating an image index associated with each image segment of each of the plurality of training images in accordance with an output of the comparison; and
   storing the vector matrix database, wherein the image index is stored in associated with the corresponding image segment in the vector matrix database.

2. The method of claim 1 wherein the training images and the at least one test image are drawn specifically for black and white images.

3. The method of claim 1 wherein the down sampling is done using wavelet decomposition.

4. The method of claim 1, further comprising comparing the NLPCA vectors with linear PCA vectors.

5. An apparatus for indexing and retrieving content comprising:
   a processor; and
   a program storage device readable by a computer system tangibly embodying a program of instructions executable by the processor to perform the method in claim 1.

6. The apparatus of claim 5 wherein the training images and the at least one test image are drawn specifically for black and white images, or color images.

7. The apparatus of claim 5 wherein the the program of instructions further comprises instructions for comparing nonlinear PCA vectors with linear PCA vectors.

8. The apparatus of claim 5 wherein the down sampling is done using wavelet decomposition.

9. The method of claim 1 wherein the training images and the at least one test image are drawn specifically to color images, and wherein each color image, when segmented, comprises a feature vector in each color separation of an associated color space, the method further comprising:
   generating a matrix comprising each color separated feature vector; and
   storing the matrix in the vector matrix database.

10. The method for indexing and retrieving content of claim 1, further comprising:
    receiving a section of a query image;
    performing down sampling on the section of the query image;
    converting the section of the query image into a corresponding vector;
    adjusting a length associated with the vector in accordance with at least one feature vector stored in the database;
    applying NLPCA data to the vector so as to generate a feature vector corresponding thereto;
    comparing a distance between the feature vector associated with the section of the query image to each feature vector in the database;
    ranking each of the plurality of training images in the database in accordance with an output of the comparison; and
    retrieving at least one training image responsive to a rank associated therewith.

11. The method of claim 10, further comprising performing wavelet decomposition on the length adjusted vector.

12. The method of claim 10, wherein the query image is a color image, further comprising:
- converting the section of the query image into corresponding color separated vectors;
- adjusting a length associated with each vector in accordance with at least one feature vector stored in the database;
- applying NLPCA data to the vectors so as to generate color separated feature vectors corresponding thereto;
- wherein the comparison further comprises comparing a distance between the generated feature matrix associated with the section of the query image to each feature matrix in the database.

13. The method of claim 1, further comprising:
- receiving a query image;
- performing down sampling on the received query image
- segmenting the down sampled query image into one or more image segments
- converting the one or more image segments into corresponding vectors;
- adjusting a length associate with the vectors in accordance with at least one feature vector stored in the database;
- applying NLPCA data to each length adjusted vector so as to generate a feature vector corresponding thereto
- comparing a distance between each feature vector associated with the query image to each feature vector in the database;
- ranking each of the plurality of training images in the database in accordance with an output of the comparison; and
- retrieving at least one training image responsive to a rank associated therewith.

14. The method of claim 13, further comprising performing wavelet decomposition on the length adjusted vector.

15. The method of claim 13, wherein the query image is a color image, further comprising:
- converting the one or more image segments of the query image into corresponding color separated vectors;
- adjusting a length associated with each vector in accordance with at least one feature vector stored in the database;
- applying NLPCA data to the vectors so as to generate color separated feature vectors corresponding thereto;
- wherein the comparison further comprises comparing a distance between the generated feature matrix associated with the section of the query image to each feature matrix in the database.

16. An apparatus for indexing and retrieving content comprising:
- a processor;
- a program storage device readable by a computer system tangibly embodying a program of instructions executable by the processor to perform a method comprising the steps of:
- downloading a plurality of training images;
- performing down sampling on the plurality of training images and at least one test image;
- sampling segmented images corresponding to the plurality of training images and the at least one test image;
- converting segments to vectors;
- applying Nonlinear Principal Component Analysis (NLPCA) data to each vector so as to transform each vector into a corresponding feature vector via an orthogonal linear transformation;
- constructing color feature vectors;
- creating a feature vector matrix database associating each feature vector with the corresponding image segment;
- comparing a feature vector associated with the at least one test image and each of the feature vectors associated with the plurality of training images;
- generating an image index associated with each image segment of each of the plurality of training images in accordance with an output of the comparison; and
- storing the vector matrix database, wherein the image index is stored in associated with the corresponding image segment in the vector matrix database.

17. The apparatus of claim 16 wherein the down sampling is done using wavelet decomposition.

18. The apparatus of claim 17 wherein the program of instructions further comprises comparing the NLPCA vectors with linear PCA vectors.

19. A method of indexing and retrieving content comprising:
- with a computer system, downloading images; sampling images;
- converting sampled images to vectors;
- applying Nonlinear Principal Component Analysis (NLPCA) data to each vector so as to transform each vector into a corresponding feature vector via an orthogonal linear transformation;
- creating a feature vector matrix database associating each feature vector with the corresponding sampled images;
- comparing a feature vector associated with the at least one test image and each of the feature vectors associated with the plurality of training images;
- generating an image index associated with each of the plurality of training images in accordance with an output of the comparison; and
- storing image index in the vector matrix database in association with the corresponding images.

20. A computer apparatus and software to facilitate the indexing and retrieval of content comprising means for:
- downloading a plurality of training images;
- performing down sampling on the plurality of training images and at least one test image using wavelet decomposition;
- sampling segmented images;
- converting segments to vectors;
- applying Nonlinear Principal Component Analysis (NLPCA) data to each vector so as to transform each vector into a corresponding feature vector via an orthogonal linear transformation;
- constructing color feature vectors;
- comparing a feature vector associated with the at least one test image and each of the feature vectors associated with the plurality of training images;
- generating an image index associated with each image segment of each of the plurality of training images in accordance with an output of the comparison; and
- storing the vector matrix database, wherein the image index is stored in associated with the corresponding image segment in the vector matrix database.

* * * * *